US010250537B2

(12) United States Patent
Young et al.

(10) Patent No.: US 10,250,537 B2
(45) Date of Patent: Apr. 2, 2019

(54) METHODS AND APPARATUSES FOR ANIMATED MESSAGING BETWEEN MESSAGING PARTICIPANTS REPRESENTED BY AVATAR

(71) Applicants: Mark H. Young, Los Gatos, CA (US); Jason A. Young, Las Vegas, NV (US)

(72) Inventors: Mark H. Young, Los Gatos, CA (US); Jason A. Young, Las Vegas, NV (US)

(*) Notice: Subject to any disclaimer, the term of this patent is extended or adjusted under 35 U.S.C. 154(b) by 156 days.

(21) Appl. No.: 15/112,960

(22) PCT Filed: Jan. 20, 2015

(86) PCT No.: PCT/US2015/011946
§ 371 (c)(1),
(2) Date: Jul. 20, 2016

(87) PCT Pub. No.: WO2015/122993
PCT Pub. Date: Aug. 20, 2015

(65) Prior Publication Data
US 2016/0344668 A1 Nov. 24, 2016

Related U.S. Application Data

(60) Provisional application No. 61/939,209, filed on Feb. 12, 2014.

(51) Int. Cl.
H04L 12/58 (2006.01)
H04W 4/21 (2018.01)
(Continued)

(52) U.S. Cl.
CPC ........ *H04L 51/10* (2013.01); *G06F 17/30867* (2013.01); *G06T 13/40* (2013.01);
(Continued)

(58) Field of Classification Search
CPC ..... H04L 51/10; H04W 4/21; G06F 17/30867
(Continued)

(56) References Cited

U.S. PATENT DOCUMENTS 7,756,536 B2  7/2010  Camp, Jr.
8,478,311 B2  7/2013  Sennett et al.
(Continued)

FOREIGN PATENT DOCUMENTS

CN  101453715 A  6/2009
WO  2007007020 A1  1/2007
WO  2013085409 A1  6/2013

OTHER PUBLICATIONS

Webopedia, "Use a Smiley Face to Show Emotion in Text Messages and Online Chat," updated Jul. 11, 2013 and posted May 21, 2009, downloaded from Webopedia.com (4pp).
(Continued)

*Primary Examiner* — Wing F Chan
*Assistant Examiner* — Leon Y Tseng
(74) *Attorney, Agent, or Firm* — Silicon Edge Law Group LLP; Arthur J. Behiel

(57) ABSTRACT

A messaging system communicates animated messages. The system generates personalized avatars of messaging participants. These avatars can be made to represent visible attributes of the participants in different art styles. For example, a tall, thin, bespectacled, brunette might be represented as a tall, thin, bespectacled, brunette avatar rendered in the style of a favorite cartoon. Messaging participants can then send messages in which the avatars of the sender and the recipient or recipients interact. For example, a message sender might convey a message "hug" that is displayed on a message recipient's device as an animation in which the sender's avatar embraces the recipient's avatar.

8 Claims, 7 Drawing Sheets

(51) Int. Cl.
*H04L 29/08* (2006.01)
*H04W 4/12* (2009.01)
*H04W 4/20* (2018.01)
*H04L 29/06* (2006.01)
*G06F 17/30* (2006.01)
*G06T 13/40* (2011.01)
*G06T 13/80* (2011.01)

(52) U.S. Cl.
CPC ............ *G06T 13/80* (2013.01); *H04L 67/306* (2013.01); *H04L 67/38* (2013.01); *H04W 4/12* (2013.01); *H04W 4/206* (2013.01); *H04W 4/21* (2018.02)

(58) Field of Classification Search
USPC ........................................................ 709/206
See application file for complete search history.

(56) References Cited

U.S. PATENT DOCUMENTS

| | | | |
|---|---|---|---|
| 8,489,982 | B2 | 7/2013 | Davis |
| 8,601,379 | B2 | 12/2013 | Marks et al. |
| 2004/0179037 | A1 | 9/2004 | Blattner et al. |
| 2007/0094330 | A1 | 4/2007 | Russell |
| 2009/0128567 | A1 | 5/2009 | Shuster et al. |
| 2010/0240405 | A1 | 9/2010 | Camp, Jr. |
| 2010/0286987 | A1 | 11/2010 | Han et al. |
| 2011/0296324 | A1 | 12/2011 | Goossens et al. |
| 2013/0295974 | A1 | 11/2013 | Reding et al. |

OTHER PUBLICATIONS

Natasha Lomas, "From 1BN to 2BN Users: Mobile Messaging Apps to Get 'Mass Adoption' in 2014, Says Ovum," posted Nov. 28, 2013 at techcrunch.com.

Wikipedia, "Markup language," downloaded Jan. 28, 2014 from Wikipedia.com.

Metaversum GMBH: "TWML—Twinity Markup Language," Jan. 28, 2010, pp. 1-32, Retrieved from the Internet: URL:http://create.twinity.com/static/twmlspecification.pdf—[retrieved on Apr. 9, 2015] paragraphs [4.4.3]-[4.4.4.5].

Wikipedia, "XMPP," downloaded Jan. 28, 2014 from Wikipedia.com.

International Searching Authority, International Search Report and Written Opinion of the International Searching Authority for international application PCT/US2015/011946 (11 pages).

METHODS AND APPARATUSES FOR ANIMATED MESSAGING BETWEEN MESSAGING PARTICIPANTS REPRESENTED BY AVATAR

BACKGROUND

Mobile phone and other portable mobile communications devices support the ability to send messages using various message-oriented communication protocols. Among them, the text- or character-based short message service (SMS) is popular with cellular service providers because SMS messages use little network capacity and generate disproportionately large revenue. Other services support instant messaging, a type of online chat service that allows participants to communicate in real time over the Internet using various proprietary and open-source protocols.

SMS and instant-messaging are popular because their messages are convenient: they are easy to generate, convey, and read. Relatively simple messages can be visually tedious, however, and the experience of communicating via such messages can have a transactional feel as the participants take turns in an asynchronous, back-and-forth exchange. Users might benefit from a richer, more interactive and entertaining messaging experience.

BRIEF DESCRIPTION OF THE FIGURES

The detailed description is illustrated by way of example, and not by way of limitation, in the figures of the accompanying drawings and in which like reference numerals refer to similar elements and in which.

DETAILED DESCRIPTION

Figure 1:
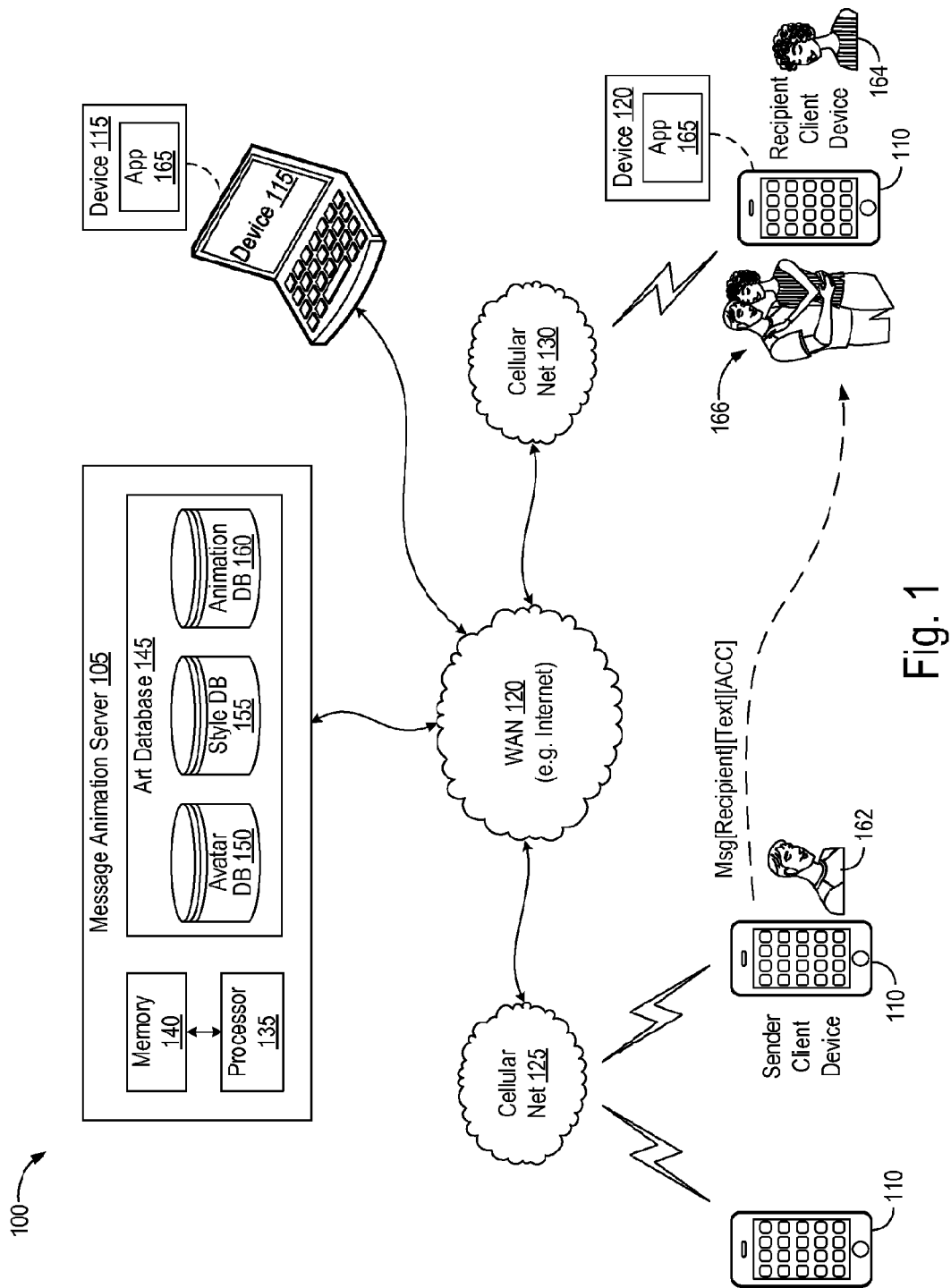
FIG. 1 depicts a system 100 for communicating animated messages.

FIG. 1 depicts a system 100 for communicating animated messages. System 100 can generate avatars for messaging participants. These avatars can be made to represent visible attributes of the participants in different art styles. For example, a tall, thin, bespectacled, brunette might be represented as a tall, thin, bespectacled, brunette avatar rendered in the style of a favorite cartoon. Messaging participants can then send messages in which the avatars of the sender and the recipient interact. For example, a message sender might convey a message "hug" that is displayed on a message recipient's device as an animation in which the sender's avatar embraces the recipient's avatar. Messaging can thus be more interactive, and participants can convey thought and emotion more effectively.

System 100 includes a message animation server 105 that communicates with any number of wireless devices 110 and wired devices 115 via a wide-area network (WAN) 120, such as the Internet. Wireless devices 110 connect to WAN 120 via cellular networks 125 and 130, but other methods of wireless access might also be used. Wireless devices can communicate with one another using e.g. SMS messaging, and server 105 can manage communication between devices using e.g. the Extensible Messaging and Presence Protocol (XMPP). The SMS and XMPP protocols are well known to those of skill in the art, so a detailed discussion is omitted for brevity.

Animation server 105 includes a general-purpose processor 135, memory 140, and an art database 145. Art database 145, in turn, includes an avatar database 150, an art-style database 155, and an animation database 160. Processor 135 executes program instructions in memory 140 with access to art database 145 to support animated messaging.

The contents of these databases are detailed below. Briefly, avatar database 145 contains, for each user of the messaging system, a list of personal attributes (e.g., gender, height, build, hair color) that can be used to render the user in a selected animation style. Style database 155 contains graphic elements for representing personal attributes in a number of art styles. For example, the personal attribute of green eyes might be represented differently in an Anime art style than in a Disney art style. Personal attributes from database 145 can be used to select corresponding graphic elements in an art style within database 155 to produce a personal user avatar. Finally, animation database 160 stores instructions for performing animations involving user avatars specified in databases 150 and 155. For example, avatars representing a messaging sender and recipient can be made to interact based on instructions embedded in the message. Such instructions are referred to herein as Animation Control Codes (ACCs), and are related to specific animations in database 160.

Devices 110 and 115 include hardware and software to support messaging. The hardware includes a user interface, memory, and a processor; the software can be a general-purpose browser, with animation server 105 rendering the animations and delivering them to recipient devices for display. Devices 110 and 115 can include a client messaging application 165 in other embodiments that supports animation to relieve the network connections of much of the load associated with communicating images and animation. Versions of application 165 may support different types of devices, such as mobile phones, personal digital assistants, and tablet, laptop, or desktop computers. Server 105 can manage each user's presences across devices and display their availability status to other users appropriately, either automatically or based upon the user's set preferences.

In some embodiments, a portion of art database 145 required to animate a given avatar or message can be downloaded to reside locally on a device 110 for subsequent use. For example, a user may download a desired DISNEY style from style database 155, the portion of avatar database 150 containing his or her friends' personal attributes, and a few animations from animation database 160. Any message received from a friend and specifying one of the stored animations can then be rendered in the DISNEY style without reference to server 105.

In the example of FIG. 1, a sender has an avatar 162 and a recipient an avatar 164. An animated message is represented as "Msg[Recipient][Text][ACC]," in which "Recipient" includes e.g. a user identifier corresponding to the recipient device, and is used by cell carriers or server 105 to direct the message; "Text" represents message content; and "ACC" is an animation control code. For example, a recipient device might use local or remote data to render and display the text message "[How are you feeling?][hug]" as an animation 166 depicting sender and recipient avatars 162 and 164 engaged in a hug and rendered in the selected style. The animation style is the same for both sender and recipient in this example, but can be different depending upon the tastes and interests of the users.

Figure 2:
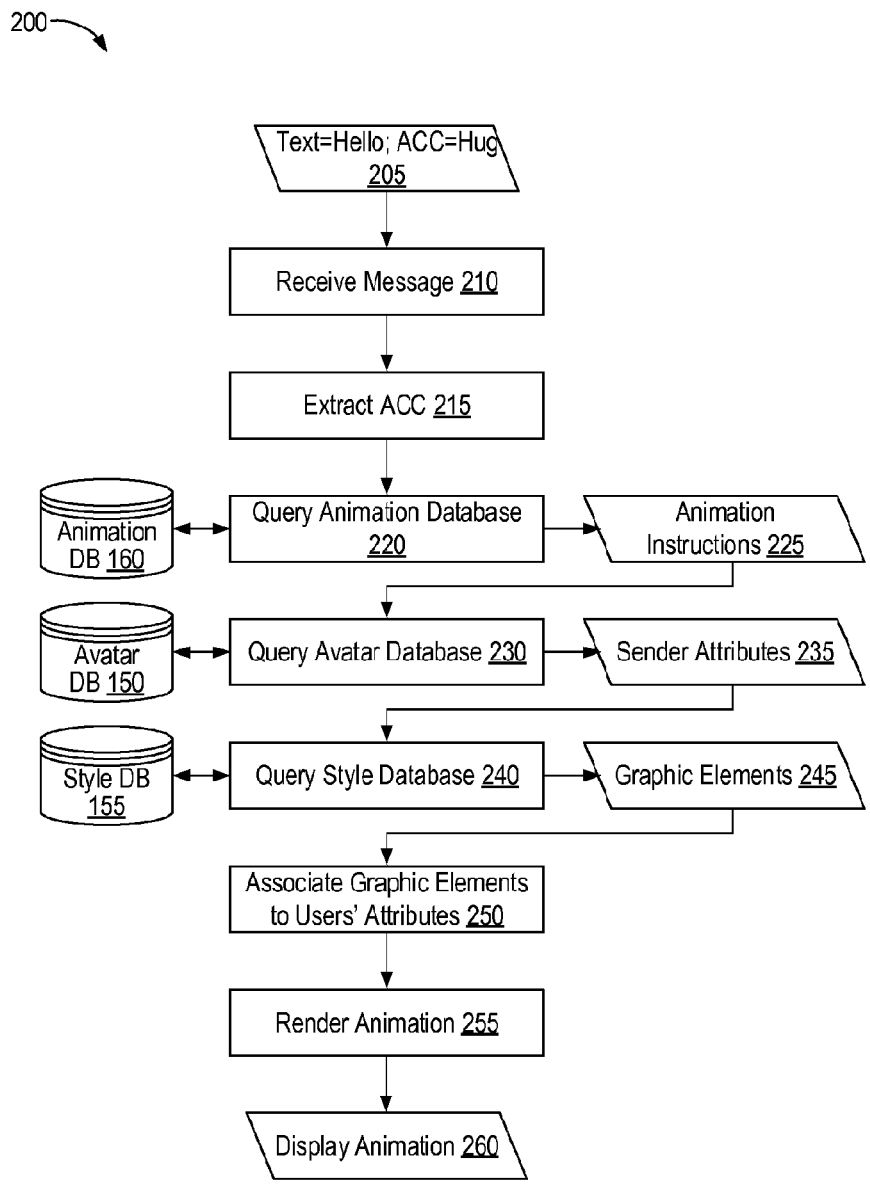
FIG. 2 is a flowchart outlining how system 100 of FIG. 1 renders an animated message for each of one or more message recipients in accordance with one embodiment.

FIG. 2 is a flowchart outlining how system 100 of FIG. 1 renders an animated message for each of one or more message recipients in accordance with one embodiment. The rendering can be done by animation server 105, a recipient client device 110, or a combination of the two. In this example, animation server 105 maintains a complete or relatively complete record of available avatar, style, and animation data, while participating devices store requisite subsets of that data as needed to render incoming and outgoing messages.

To begin, a sender directs a message 205 to one or more recipients. This example assumes a one-recipient message that includes some text (e.g., "Hello") and an ACC representative of an animation (e.g., a hug). Such a message can be a simple SMS message generated on a client device using conventional software, in which case the ACC can be specially formatted or tagged to distinguish it from other text (e.g., the ACC "#hug" can specify a hug). Character strings can also act as ACCs. For example, "LOL," for "laugh out loud," in the message field can inspire an animation of the sender's avatar laughing out loud, with our without accompanying sound. Client devices can also use an application 165 with support for this type of animated messaging, in which case a hug can be a menu option. The message might also include any type of attached digital data (e.g., documents, photos, videos, audio recordings), but these are not required for this illustration.

However the message is generated, a recipient device 110 receives the message (210) and extracts the ACC (215). In step 220, the recipient's device 110 queries animation database 160—either a local copy or from server 105—to retrieve the requisite instructions 225 for rendering the animation. The recipient device 110 also queries avatar database 150 (230)—either a local copy or from server 105—to retrieve the requisite sender attributes 235 for rendering the sender's avatar (e.g., tall, thin, bespectacled, brunette, male). Though not shown, the recipient device will also have or retrieve the recipient's attributes for rendering the recipient's avatar (e.g., short, stout, blond, female). The recipient device 110 queries style database 155 (240) from server 105 or a local cache to retrieve the graphic elements 245 for rendering the avatars of both the sender and the recipient in an art style selected by the recipient. In this example, a database of graphic elements like shoes, bodies, heads, hair, and accessories can be used to assemble the sender's tall, thin, bespectacled, brunette, male avatar and the recipient's short, stout, blond, female avatar in the selected DISNEY art style (250). The animation is then rendered (255) using the assembled avatars, and the rendered animation is displayed (260).

In some embodiments the animation is displayed at the sender's device too, in which cases the sender and recipient avatars may be represented in different art styles. Sender animation may await an alert reporting message receipt. As noted below, animating the message on both sender and recipient devices supports enhanced interactions between message participants.

Animations are rendered to create a video clip of the sender/recipient interaction. Server 105 can render such animation in a common video format and convey the resultant file to client devices. Alternatively, each client device can include some or all of the data required to render and display the animation. As will be readily apparent to those of skill in the art, the operations detailed in connection with FIG. 2 or elsewhere can be performed in different orders, and some of those operations can be performed in parallel. Moreover, the operations can be performed on server 105, clients 110, or a combination of the two.

Figure 3:
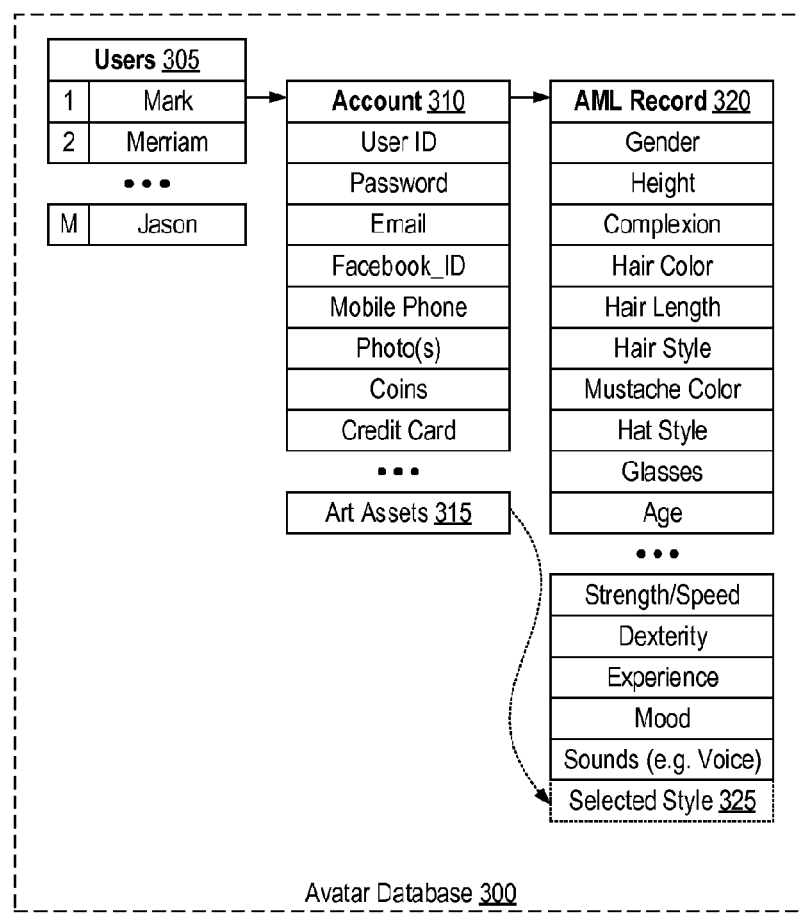
FIG. 3 is a block diagram illustrating an example of an avatar database 300 that can be used for e.g. avatar database 150 of FIG. 1.

FIG. 3 is a block diagram illustrating an example of an avatar database 300 that can be used for e.g. avatar database 150 of FIG. 1. Database 300 includes a list of users 305—potential messaging participants. Each user is provided with an account record 310 that includes various self-explanatory fields, including a User ID and Password for authentication and various other personal data. Account record 310 also includes a field 315 for specifying available art assets. Such assets may include proprietary art styles and animations that the user may gain access to by performing required actions, making payments of "coins" or real money, etc. For example, a DISNEY art style and related animations might be available on a subscription basis.

Each user is also provided with a list of personal attributes termed an Animation mark-Up Language (AML) record 320. Each record 320 includes a list of visible attributes that can be used to render the user's avatar in any art style. Records 320 can be simple text records, and can thus be much easier to store and send than a digital representation of an avatar. Moreover, AML records allow message participants to render any user in a preferred art style. The selected style for a given rendering of an avatar can be specified by the sender or the recipient. For example, a sender might render a message animation using an anime art style, whereas the recipient might render the same message animation using a DISNEY art style. The sender's and recipient's animations would differ in style, but both would include avatars with visual attributes of the messaging participants.

Each AML record 320 can include visible, invisible, static, and variable personal attributes. For example, attributes can relate to sound (e.g., voice) and motion (e.g., strength and dexterity). Some attributes can be specified by the user, while others can be generated or modified by server 105, application 165, or both. For example, a user's dexterity can improve with experience. Each record 320 can optionally include an art style field 325 that allows a user to suggest a preferential rendering style. The sender might express a preference for an anime avatar, for example, and the recipient can elect to use that style to render one or both avatars in lieu of the recipient's selected art style.

Figure 4:
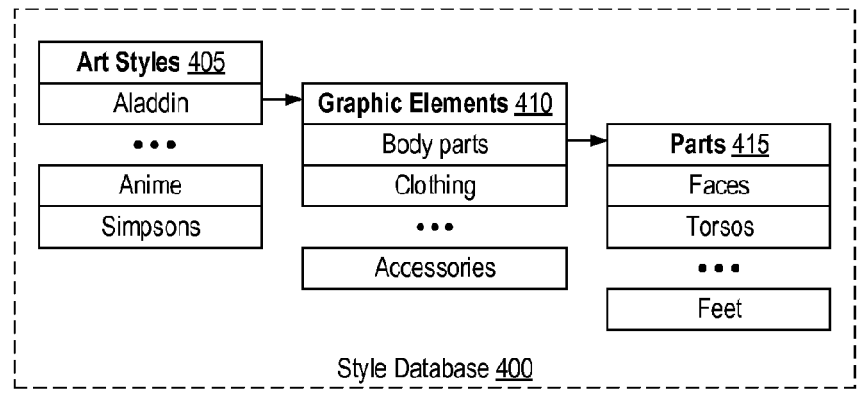
FIG. 4 is a block diagram illustrating an example of a style database 400 that can be used for e.g. style database 155 of FIG. 1.

FIG. 4 is a block diagram illustrating an example of a style database 400 that can be used for e.g. style database 155 of FIG. 1. Database 400 includes a list of art styles 405, each of which represents a style of animation. In this context, an "art style" is a distinctive appearance that results from the manner in which animated characters are depicted and animated. A foregoing example references a DISNEY art style, but there are many DISNEY art styles. The Disney film Snow White and the Seven Dwarfs (Disney, 1937) represents human figures in an internally consistent style, but that style is visually distinct from the manner in which human figures are represented in Aladdin (Disney, 1992). Still more distinct, Beauty and the Beast (Disney, 1991) represents anthropomorphized objects in a consistent art style that is dramatically different from the other two movies mentioned here. Assuming the Aladdin art style was available in database 400, the Aladdin record would include collections of graphic elements 410 for use in creating avatars from AML records 320. Graphic elements 410 can include body parts 415 (e.g., faces, expressions, arms, hands, legs, feet), clothing (types, styles, and colors), and accessories (glasses, purse, watch, weapons). A user's AML record 320 can be used to select those graphic elements required to render the user's avatar in the selected style. Assuming a human avatar in the Aladdin art style, a user's AML record could be used to construct an avatar that would look like a human character in that film. Alternatively, a user's AML record might be used to select an existing avatar that most closely represents the user, or that the user prefers.

Art styles can be used to render messaging-participant avatars abstractly or accurately in dependence on the granularity of the information in the AML records and associated graphic elements. The animation can also afford a range of complexity, from very simple to lifelike, in dependence upon the sophistication of the animation models and the hardware and software available to process them.

Figure 5:
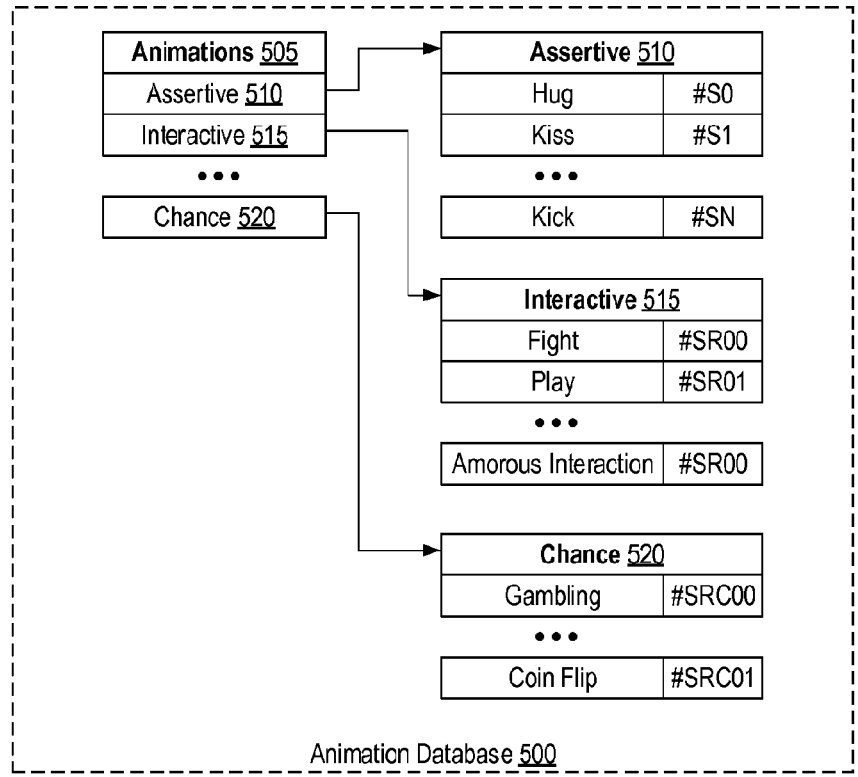
FIG. 5 is a block diagram illustrating an example of an animation database 500 that can be used for e.g. animation database 160 of FIG. 1.

FIG. 5 is a block diagram illustrating an example of an animation database 500 that can be used for e.g. animation database 160 of FIG. 1. Database 500 divides animations 505 into assertive, interactive, and chance categories. These animations can be further divided into e.g. 2D and 3D animations. Each animation can represent a generic motion using e.g. a model of a virtual skeleton, which can be applied to a stylized avatar to render an animation. For example, an animation model of a hug can be applied to the limbs, eyes, mouth, clothes, etc., of a pair of stylized user avatars to render the hug for display. Methods of creating and storing animation models are well known to those of skill in the art, so a detailed discussion is omitted for brevity.

Assertive animations 510 are those specified in a message, by the sender, and are indexed by an ACC #S[N:0], where the "S" is for "sender." Interactive animations 515 are specified by combining an ACC passed by the sender with a responsive ACC of the recipient, and are indexed by an ACC #SR[N:0]. The "S" is for "sender" and the "R" for "recipient" to indicate that the ACC used to reference the animation is derived by combining ACCs from two (or more) messaging participants. A sender might specify a punch to the recipients, for example, in which case a prepared recipient can automatically respond with a block and counter-punch. In that case both sender and recipient can be presented with an animation in which the recipient's avatar gets the better of the sender's. Additional participant ACCs can also be combined to render the animation. For example, the sender might have a counter to the recipient's countermeasure; a group message may combine ACCs from additional recipients, or both. A single message can thus snowball into a relatively complex interaction that is ultimately resolved and animated for all involved participants by system 100.

Chance animations 520 can be assertive or interactive, but are specified by combining an ACC passed by the sender with a random or pseudo-random variable, a responsive ACC of the recipient, or both. Chance animations 520 are indexed here by an ACC #SRC[N:0]. The "S" is for "sender," the "R" for "recipient," and the "C" for the chance variable. In the foregoing interactive example, the context between the punch and counter might be resolved using the variable, for example. In other examples, a sender might convey a message to be animated pending the outcome of an event, such as the results of a sporting match, or the animation might be based in part on the location or weather of one or more participants. For example, avatars may be dressed in a local fashion, and the animation may appear with a backdrop that reflects the local weather in the selected art style. In still other embodiments the variable might be or include the age of the sender or recipients. For example, the nature or graphical content of an amorous interaction may be based on the verified age of the user associated with each device 110. Children might be limited to G-rated avatars and animations, for example, so animations can be selected in a style suitable for a designated age or rating. Message text and audio can likewise be sanitized so that each messaging participant is presented with an age-appropriate version of the message. Other embodiments allow users to specify a tolerance, like a television or video-game rating, as part of their preference selection. In still other embodiments the user's address or location can serve as a variable to tailor messages for local laws, and sensibilities. The same message directed to different recipients can thus be rendered as desired by each recipient, or as required to conform to the local laws and community standards of each recipient.

Figure 6:
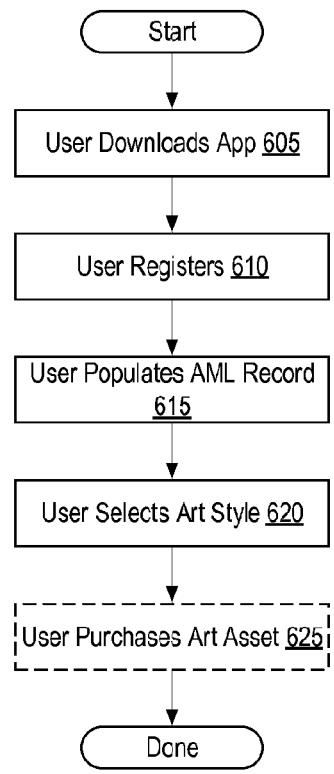
FIG. 6 is a flowchart 600 illustrating how a user of one of device 110 of FIG. 1 creates an account with animation server 105.

FIG. 6 is a flowchart 600 illustrating how a user of one of devices 110 of FIG. 1 creates an account with animation server 105. The user starts by downloading application 165 (205). The recipient user might be inspired to do so by a message (e.g., text or email) alerting him or her of an incoming message that includes some special feature, such as an animation. The message might say, for example, "Merriam has sent you a kiss. To accept, see [hyperlink]." The hyperlink may allow the user access to the message and animation via a general-purpose browser or the like, but performance would likely be enhanced using messaging application 165.

Application 165 prompts the user to register (610) a user ID and, possibly, other authentication information. The user is prompted to populate an AML record listing attributes of the user that will be helpful in creating a personalized avatar (615). Default or minimalist avatars can be provided for users who are unable or uninterested in populating their AML record. In some embodiments, application 165 can access an image of the user and derive the user's attributes therefrom to automatically populate the user's AML. User voice data can likewise be used to create user attributes.

The user can select an art style (620), or be provided one by default. In some embodiments the user can purchase additional art styles (625), or earn them in exchange for some minimum level of message usage in the company of advertisements. Application 165 or server 105 may allow users to enter custom art styles in other embodiments.

Figure 7:
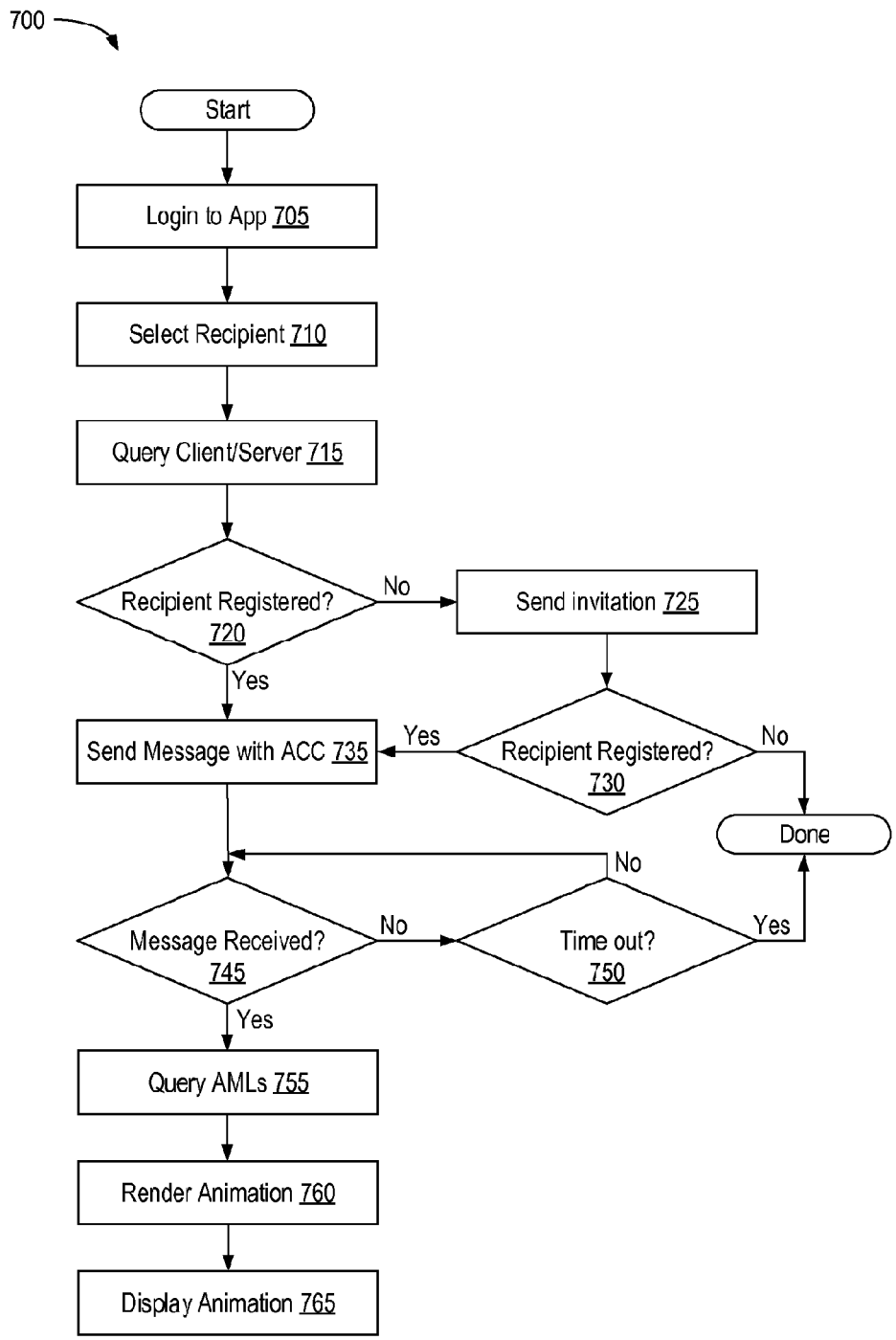
FIG. 7 is a flowchart 700 illustrating a method for sending an animated message from a sender's device 110 to a recipient's device 110 (FIG. 1) in accordance with one embodiment.

FIG. 7 is a flowchart 700 illustrating a method for sending an animated message from a sender's device 110 to a recipient's device 110 (FIG. 1) in accordance with one embodiment. This example assumes that each device 110 includes an instantiation of application 165, but this need not be the case.

The sender logs into or activates the sender's application 165 (705). Using a drop-down menu, or some other type of user interface, the sender selects a recipient or enters the recipient's contact information—e.g., mobile number, email address, or message ID (710). As part of this process, application 165 queries local or remote databases to determine whether the recipient is registered with server 105 (715). If the recipient is not registered, application 165 either sends an invitation to the recipient to join the service, or instructs server 105 to convey such an invitation (725). This invitation can be part of or separated from the message that the sender originally meant to communicate to the recipient.

If the recipient is not registered, and does not register within a specified time period (decision 730), the animation is aborted (Done). If the recipient registers, per decision 730, then the sender's device sends the message with the ACC (735). The message may be sent regardless of the outcome of decisions 720 or 730, in which case the ACC will likely be ignored.

Once the message is sent, the sender's device awaits confirmation that the message was received. This confirmation can come from the recipient's device, one of the cellular networks, or from server 105. If the message is received (decision 745), then the sender's device 110 queries local or remote databases for the AML records associated with the sender and the receiver (755), using these to formulate the respective avatars. The sender device 110 then renders (760) and displays (765) the animation specified by the message ACC. Returning to decision 750, the animation is aborted if the message times out.

Some messages may require a direct network connection between the messaging participants, or a specific type of network connection (such as wife or cellular). Server 105 may know, for example, that the designated recipient device has not downloaded an animation model required to animate the message, and does not have a connection suitable to retrieve the model. The recipient may have set his or her cell phone to download such data only when a wireless access point is available. If the recipient device is not immediately available, or is otherwise incapable of rendering the message, server 105 may choose to hold the message until the recipient device is prepared to render the message. Alternatively, server 105 may require the recipient to be immediately available and directly reachable on the network in order to send the message. Server 105 can report message progress or failure to the sender's device.

In cases where the participants of a conversation are not directly accessible due to network conditions such as firewalls or other network-address translation, server 105 may use central servers as a rendezvous point for those participants and proxy that traffic.

Per decision 745, the sender's device awaits animation in this embodiment because one or more responsive ACCs, a variable, or some combinations of responsive ACCs and variables may be required to render the animation. In other embodiments the animation may be displayed on the sender's device earlier or not at all, or may be displayed only if the animation specified in the sender's message is altered by e.g. a variable or responsive ACC.

Figure 8:
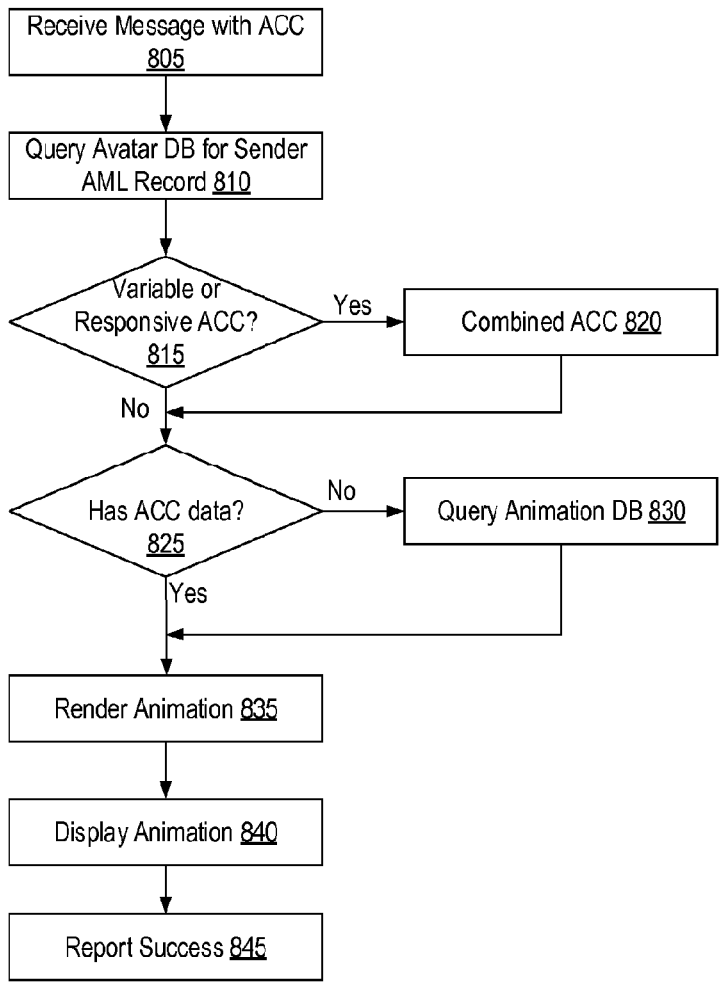
FIG. 8 is a flowchart 800 illustrating a method for rendering and displaying an animated message on a recipient's device 110 in accordance with one embodiment.

FIG. 8 is a flowchart 800 illustrating a method for rendering and displaying an animated message on a recipient's device 110 in accordance with one embodiment. As with the example of FIG. 7, this embodiment assumes that the sender's and recipient's devices 110 each include an instantiation of application 165. The process starts when a message with an ACC is received (805). The message can be conveyed via server 105, or via e.g. a conventional SMS channel. The message identifies the sender, such as by name or mobile number, and the recipient's device 110 queries local memory or avatar database 150 for the sender's AML record (810). In other embodiment all or a subset of the sender's AML record can be conveyed with the message.

Per decision 815, the recipient's device determines whether the recipient has configured the device to respond to the incoming message, such as by providing a counter measure as noted previously. If so, the message ACC and responsive ACC are logically combined into a composite ACC (820). Some other variable might also be considered in creating the composite ACC.

Whatever the ACC, if the recipient's device does not have the corresponding data to render the identified animation, software 165 queries animation database 160 to obtain the requisite model (decision 825, step 830). Once the recipient device has the model, the device employs the sender and recipient AML records and the animation model to render the specified animation (835). A user interface on the recipient's device 110 then displays the rendered animation (840). The recipient device 110 then sends a message back to the sender reporting successful message delivery (845).

The foregoing examples employ ACCs embedded in messages to specify animation. Other embodiment forego ACCs for at least some forms of animation control. For example, a message written in uppercase text may be interpreted as yelling, with the sender's avatar rendered and displayed accordingly. Content that auto deletes may animate the avatar to animate "shhh," and encrypted content may inspire an animation in which one or more avatars mouths are zipped shut.

The foregoing examples can be embodied as methods, systems, or computer-program products, and may be accomplished using various combinations of hardware, software, and computer-readable media. Program code may execute on a remote server, a local device, or some combination of both. Computer program instructions and data may be provided to a processor of a general purpose computer, special purpose computer, or other programmable data processing apparatus to produce a machine, such that the instructions create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The singular forms "a", "an" and "the" are intended to include the plural forms as well, unless the context clearly indicates otherwise. Thus, a component described using a singular noun (e.g., a server, a client, a process, a memory) is intended to include one or more components. The use of the singular form is for ease of expression, and should not be read to exclude the common practice of distributing computing tasks among resources.

The present invention has been described in connection with specific embodiments. After reading this disclosure, variations of these embodiments will be apparent to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A data processing system for rendering an avatar of a sender of a message on a device of a recipient of the message, the data processing system comprising:
   a memory storing a program; and at least one processor to execute the program, wherein execution of the program configures the at least one processor to:
receive an animation markup record listing visible attributes of the sender;
receive an indication of a selected art style for the recipient;
query a database storing art styles, including the selected art style, each art style including graphic elements that can be combined to create a corresponding avatar of the sender in a corresponding animation style of the recipient; and
relate the visible attributes of the sender to the graphic elements of the selected art style to render the avatar in the corresponding animation style of the recipient.

2. The data processing system of claim 1, wherein execution of the program configures the at least one processor to:
receive a message with an animation control code (ACC);
query an animation database for an animation corresponding to the ACC; and
animate the avatar to perform the animation.

3. The data processing system of claim 1, wherein execution of the program further configures the at least one processor to:
receive a second animation markup record listing visible attributes of the recipient; and
relate the visible attributes of the recipient to the graphic elements of the selected art style to render a recipient avatar in the corresponding animation style.

4. A method for animating a message from a sender to a recipient, the method comprising:
receiving, from the recipient, an indication of a recipient-preferred art style of graphic elements;
identifying the sender from the message;
querying an avatar database for a first avatar associated with the sender and a second avatar associated with the recipient, the avatar database including a first list of visible attributes of the sender and a second list of visible attributes of the recipient;
extracting a message animation-control code (ACC) from the message;
querying an animation database for an animation corresponding to the message ACC; and
querying an art-style database for the recipient-preferred art style of graphic elements and rendering the first avatar by associating the graphic elements with corresponding ones of the visible attributes in the first list of visible attributes of the sender.

5. The method of claim 4, further comprising rendering the second avatar by associating the graphic elements with corresponding ones of the visible attributes in the second list.

6. The method of claim 4, further comprising querying the avatar database for a responsive ACC associated with the message ACC, wherein the animation corresponds to the message ACC and the responsive ACC.

7. The method of claim 6, further comprising retrieving a variable, wherein the animation corresponds to the message ACC, the responsive ACC, and the variable.

8. The method of claim 4, further comprising displaying the rendered first avatar in the animation corresponding to the message ACC.

* * * * *